Aug. 1, 1967   E. R. HATTENDORF ETAL   3,333,795
FLARE COMPUTER
Filed Jan. 10, 1966   2 Sheets-Sheet 1

INVENTORS
EDWIN R. HATTENDORF
CHARLES A. OPPEDAHL
BY
Moody & Anderson
AGENTS

United States Patent Office 3,333,795
Patented Aug. 1, 1967

3,333,795
FLARE COMPUTER
Edwin R. Hattendorf and Charles A. Oppedahl, Cedar Rapids, Iowa, assignors to Collins Radio Company, Cedar Rapids, Iowa, a corporation of Iowa
Filed Jan. 10, 1966, Ser. No. 519,790
15 Claims. (Cl. 244—77)

This invention relates generally to aircraft control and more specifically to the terminal landing control of an aircraft in the vertical plane from some predetermined altitude to zero or touchdown on the basis of a programmed descent rate.

Glide slope systems have for quite some time been used to guide the aircraft down to two hundred feet of altitude. More recently, with improved glide slope beams and with improved gain scheduling and filtering, systems have been used to reach one hundred feet of altitude and are expected to finally reach a flare altitude such as fifty feet. At flare altitude, new means of control must be provided to alter the aircraft flight path and achieve a touchdown at a much reduced descent rate.

The present invention provides a means for controlling an aircraft the last few critical feet of altitude from, for example, an altitude of fifty feet to zero feet. This type of control necessarily then defines a means for commanding an asymptotic or flare approach during this critical altitude period and a means to assure actual touchdown or intercept with the runway.

The present invention is featured in a means for controlling the landing of an aircraft on the basis of a programmed descent rate by means of which a flare mode of landing may be smoothly initiated and by means of which touchdown may be smoothly and positively realized. The system to be described develops from various input parameters including radio altitude, a flare command output signal which may be employed in autopilot or flight director circuitry to formulate a pitch command. The present invention develops a flare command signal to be utilized in place of a glide slope signal in an aircraft control system. The descent rate is commanded as a programmed function of altitude by passing radio altitude signals through a shaping network. For an initial phase of the control, a constantly decreasing descent rate is commanded to effect an asymptotic approach in the vertical plane and, at a predetermined point in the program, a constant minimum descent rate is commanded for the terminal phase of the landing.

The control system of the present invention incorporates means assuring a smooth acquisition of the programmed descent rate by effecting an "intercept" of the command function at that particular rate of descent the aircraft is experiencing just prior to the flare maneuver. The descent rate of the aircraft is therefore smoothly controlled and violent pitch commands at the transition between glide slope and flare command modes are prevented.

A further feature of the present invention is the provision of a programmed rate of descent for aircraft landing wherein flare command signals developed in accordance with a predetermined programmed descent rate are in the form of "pitch-up" signals as flare is begun and, at a predetermined lower altitude may additionally be in the form of "pitch-down" signals.

The manner in which the above objects and features provide a novel flare computation for control of aircraft may be realized by reading the following description in conjunction with the accompanying drawings in which.

Figure 4:
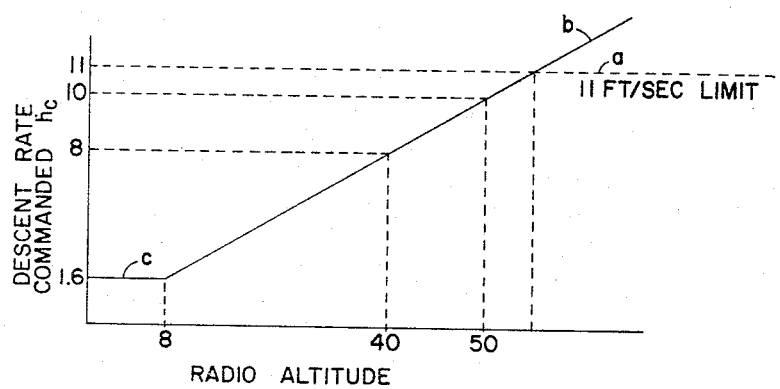
FIGURE 4 is a diagrammatic representation of the flare command function employed in the present invention.

Referring to FIGURE 4, a flare command function incorporated in the invention is pictured as a plot of commanded descent rates, $\dot{h}_c$, as a function of aircraft altitude. As will be further explained, the aircraft in making an approach will actually "intercept" the command function pictured in FIGURE 4 at some point on the sloped portion $b$ of the function. If the aircraft is at an altitude of fifty feet the function commands a descent rate of ten feet per second. The sloped portion $b$ of the function then commands a constantly decreasing descent rate with decreasing altitude until eight feet of altitude is experienced. As will be explained more fully later, however, because of a flare command limiter which appears later in the signal path, the output flare command above a predetermined altitude will not call for a descent rate which is greater than the descent rate existing. This constantly decreasing descent rate effects an asymptotic vertical path to eight feet of altitude. From eight feet of altitude to zero altitude or touchdown, the aircraft is under the control of the constant portion $c$ of the function which is commanding a descent rate of 1.6 feet per second. This latter portion assures positive touchdown of the aircraft.

It is to be understood that prior to the control of the aircraft in accordance with the flare command function pictured in FIGURE 4, the aircraft would be under the control of some form of glide slope and/or glide slope extension computation and upon fifty feet of altitude being experienced, a sensing device would remove the vertical control by means of glide slope or other means and substitute in the pitch command formulation, a flare command signal generated on a programmed basis in accordance with that pictured in FIGURE 4.

From appropriate input parameters, a first signal proportional to the altitude rate actually being experienced by the aircraft is developed. A second signal is formulated as a commanded altitude rate in accordance with the function of FIGURE 4. Means are incorporated to compare these signals with the discrepancy between the two contributing to the flare command signal. The flare command signal substitutes for the vertical command glide slope signal to produce ultimately a pitch command of proper sense to equate the descent rate being experienced with the descent rate commanded for the altitude. Since a violent maneuver of any sort is not tolerated at low altitudes, means will be described wherein the actual descent rate being experienced by the aircraft as the fifty foot altitude point is reached will be maintained until an altitude is experienced which, in accordance with the command function, produces a commanded descent rate equal to that being experienced. From this point on, the command rate (at some "intercepted point on portion $b$ of the command function) is reduced linearly from the "intercept" point to the terminal phase of constant descent rate command.

Figure 1:
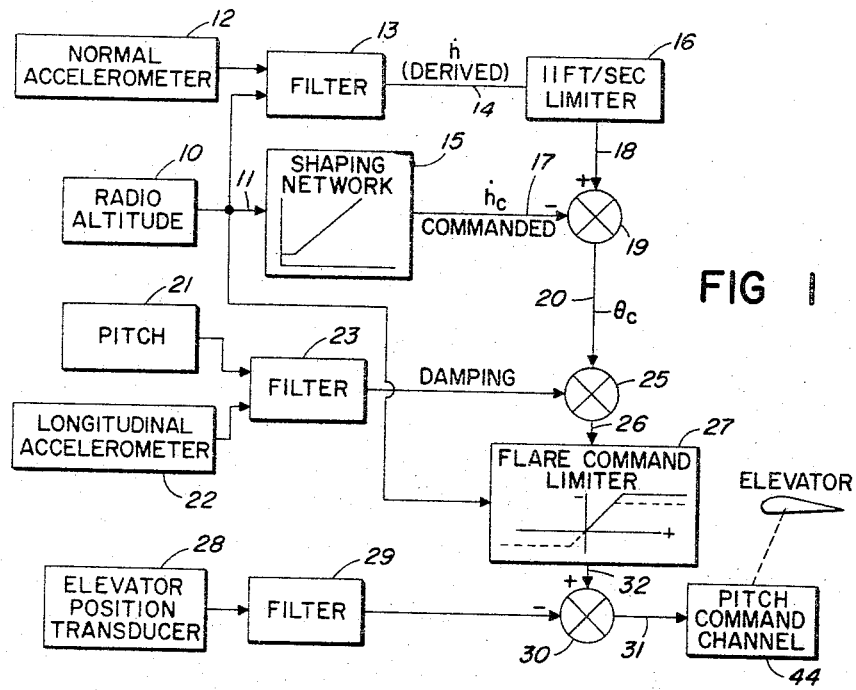
FIGURE 1 is a functional diagram of a flare computer in accordance with the present invention.

The manner in which the invention may be embodied to realize the above-described control features is illustrated in the functional embodiment of FIGURE 1.

The embodiment of FIGURE 1 includes means for formulating the flare command signal as the discrepancy between programmed descent rate and the actual descent rate being experienced for altitudes from fifty feet to touchdown. This discrepancy or error signal is then appropriately damped to arrive at a flare command output signal for utilization in vertical flight control circuitry in lieu of glide slope deviation.

Inputs to the flare computer of the present invention include a source of radio altitude signals 10, a signal from a normal accelerometer 12, a pitch attitude indicative signal 21, a signal from a longitudinal acceleration device 22, and a signal from an elevator position transducer 28. The computer of FIGURE 1 develops from these input parameters a flare command output signal 31 which may be applied to an autopilot or flight director pitch channel computer 44 as a pitch command signal to control the aircraft elevator in what will be termed a "flare" mode, that is, a control of the aircraft from fifty feet of altitude down to touchdown.

The signals from the radio altitude source 10 are combined with the normal acceleration signal through a filtering means 13 to derive an accurate, noise free descent rate signal 14, ($\dot{h}$). Filtering means 13 would provide appropriate differentiation of radio altitude signal and augmentation with certain frequency components of the normal acceleration signal to provide an output signal 14 reliably proportional to the actual descent rate being experienced by the aircraft. The derived descent rate 14 is then applied to a limiter 16 which limits the signal at eleven feet/sec., thus reducing noise due to uneven terrain prior to arriving over the runway and allowing accurate computations over the runway to be achieved more quickly. The output 18 from limiter 16 is applied as a first input in a "positive sense" to a mixer 19. A second input 17 to mirer 19 is in the form of a descent rate to be commanded ($\dot{h}_c$). The commanded descent rate $\dot{h}_c$ is developed from application of the radio altitude signal 11 to a flare command function shaping network 15 which develops a programmed output 17 in the form of a commanded descent rate $\dot{h}_c$ as previously described with reference to FIGURE 4. The commanded descent rate $\dot{h}_c$ is applied in a "negative" sense to mixer 19, that is, the derived (actual) descent rate 18 and the commanded descent rate in accordance with the shaping function of network 15 are applied to mixer 19 in opposite sense. It is to be understood that this opposite sense would imply positive or negative polarity if the circuitry is computing DC signals—or alternatively, would imply opposite phase as concern AC computations.

The output 20 from mixer 19 is the discrepancy between the descent rate being commanded and that being experienced. Mixer output 20 is applied as a first input to a further mixer 25 where it is combined with a damping signal 24. Damping signal 24 is formulated from applying a pitch attitude signal and a longitudinal acceleration signal from sources 21 and 22 through a filtering means 23. The longitudinal acceleration damping feature contributes to more consistent flares when different throttle-back schedules are used by the pilot and when wind shears are sustained. The output 26 from mixer 25 is then in the form of damped flare command which is applied to a flare command limiter 27. As will be further described, the flare command limiter 27 passes only those signals of a "positive" sense for altitudes in excess of a predetermined altitude of, for example, twenty feet. Above the predetermined altitude the flare command limiter 27 passes positive input signals with a transfer ratio of unity up to a particular limit and the output 32 from the flare command limiter is then in the form of a positive flare command signal (which commands a pitch-up maneuver). The flare command signal is further combined in a mixer 30 with an elevator feedback signal from transducer 28 after the feedback signal has been passed through a filtering means 29. Elevator feedback is employed to allow the use of high steering sensitivity during the flare mode of operation and to contribute additional damping to the flare maneuver.

The output 31 from mixer 30 is then in the form of a flare command signal which is applied to the aircraft pitch command formulation circuitry 44. The pitch command circuits 44 controls the aircraft elevators to make good the commanded descent rate.

Mention was made that the present invention effects an "intercept" of the flare command function determined by shaping network 15 so that the transition from glide slope to flare command control at the fifty feet altitude point is effected smoothly. For this purpose, the present invention combines the transfer functions of the command shaping network 15 and the flare command limiter circuitry 27 in such a manner that the aircraft control changes over to flare command without any abrupt change of aircraft pitch command. For example, with reference to FIG. 4, the command function of the shaping network 15 calls for a command descent of ten feet per second when altitude signal is proportional to fifty feet which suggests that the aircraft would be abruptly commanded to a descent rate of ten feet per second regardless of the descent rate it was experiencing as it reached the fifty foot altitude mark. The combined functions of shaping network 15 and flare command limiter network 27 prevent this situation from developing and effect instead a smooth transition. Above an altitude of twenty feet flare command limiter 27 passes signals of one sense only, which as previously described, might be either a particular polarity or a particular phase. Whenever the commanded descent rate 17 from the shaping network 15 is in excess of the derived or experienced descent rate 14 (which cannot exceed eleven ft./sec. as determined by limiter 16), the output from mixer 19 is of a sense which will not be passed by the flare command limiter 27 since flare command limiter 27 passes only "positive" sense input signals. If then the sense of the commanded descent rate $\dot{h}_c$ from shaping network 15 is designed to be "negative" while the derived descent rate $\dot{h}$ is chosen to be of opposite or "positive" sense, it is seen that the output 20 from mixer 19 will be of positive sense, and thus passed through flare command limiter 27, only when the experienced or derived descent rate 18 is in excess of the commanded descent rate 17 from shaping network 15. The "positive" then becomes ultimate "pitch-up" command. Generally then, there is no output from the flare command limiter 27 until the aircraft reaches an altitude where the commanded descent rate in accordance with the shaping function 15 is less than the actual rate of descent of the aircraft at the time, in which case the output 32 is of positive sense and the ultimate command is a pitch-up correction.

Below twenty feet of altitude, the flare command limiter function is modified as a function of altitude such that relatively small pitch-down or "negative" command may be passed. The latter expedient assures definite touchdown and shortens the landing distance if the pilot has over-controlled or if wind gusts have blown the aircraft above the desired path such that a pitch-down command is actually required in the terminal phase of the flare maneuver.

For example, if the aircraft is descending at ten feet per second at the time fifty feet of altitude is experienced, the flare command function is "intercepted" at precisely this point since the function commands ten feet per second descent rate at fifty feet of altitude. As altitude is diminished, the command function calls for increasingly lesser descent rates. To the extent this command rate is not met, but is exceeded, by the actual descent rate, a flare command output of positive sense is generated as an error signal calling for a "pitch-up" maneuver to maintain the commanded function. The only time that the flare command output 21 from mixer 30 is negative in sense (calling for a pitch-down correction) above twenty feet of altitude is in the situation of an overcorrected elevator position applying an elevator feedback signal to mixer 30 in excess of any positive sensed output from the flare command limiter.

By way of further example, should the aircraft reach fifty feet of altitude with a descent rate of less than the commanded ten feet per second, the aircraft will continue to descend at this lesser rate until the subsequently reduced altitude generates a commanded descent rate which is less than that at which the aircraft is descending so as to produce a positive sensed output from the flare command limiter to call for a pitch-up corrective until there is correspondence between the commanded descent rate and that being experienced. In this manner the aircraft actually "intercepts" the command function pictured in FIGURE 4.

Should the aircraft reach fifty feet of altitude with the descent rate in excess of the ten feet per second called for by the shaping network, the output from mixer 19 will be of a positive sense and call for a pitch-up flare command output to slow the descent rate, until at some altitude the experienced descent rate and that commanded by the shaping network are equal and the flare command output are reduced to zero. The limiter 16 limits the derived rate to eleven feet per second to prevent a violent maneuver in this situation.

It is to be realized that the flare computer of the present invention takes over control of the aircraft at the termination of a glide slope phase of control and that it is not to be expected that the aircraft will be descending at some phenomenal descent rate at this time nor would it be expected that the aircraft have a zero descent rate or a "positive" descent rate at this time.

Figure 2A:
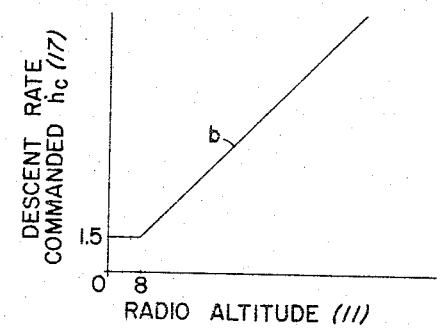
FIGURES 2a and 2b are, respectively, a flare command function and a functional diagram of a system for generating the function in the flare command shaping network of FIGURE 1.
Figure 2B:
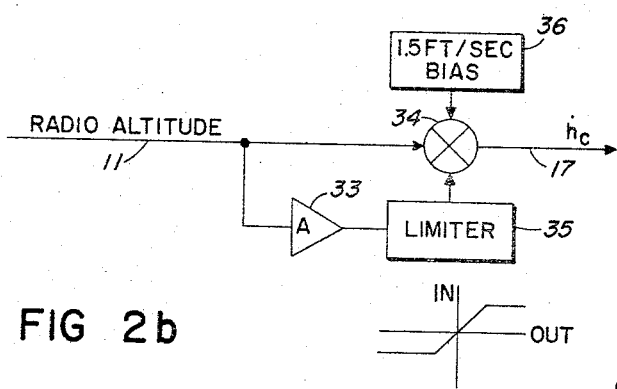

FIGURE 2b illustrates an embodiment of the shaping network 15 which might be employed to generate the flare command function of FIGURE 4. For reference, the flare command function is reproduced in FIGURE 2a. The desired function produces a constant descent rate $\dot{h}_c$ of 1.5 feet/second for altitude input from zero to eight feet. Beyond eight feet of altitude, the function presents a linear change in descent rate with changing altitude. With reference to FIGURE 2b, the radio altitude FIGURE 11 is applied as a first input to a mixer 34. A 1.5 ft./sec. bias 36 is additionally applied to mixer 34. Radio altitude 11 is further carried through an inverting amplifier 33 to a limiter 35 with the output from limiter 35 being applied as a third input to mixer 34. The output 17 from mixer 34 becomes the commanded descent rate $\dot{h}_c$. Limiter 35 might be an operational amplifier providing unity gain for input signals from zero to a signal corresponding to eight feet of radio altitude. Thus, for radio altitude input signals 11 from zero up to eight feet of altitude, the direct application of radio altitude and the inverted application of radio altitude to mixer 34 cancel one another, and the output 17 is attributed only to the 1.5 feet per second bias 36. As the limit of limiter 35 is reached at eight feet of radio altitude, the output 17 from mixer 34 becomes the bias voltage plus the excess of radio altitude 11 over the eight feet limit established by limiter 35; thus the output function increases linearly with increasing altitude from the eight foot altitude mark. The portion b of the transfer function of network 15 thus represents a unity gain function.

Figure 3A:
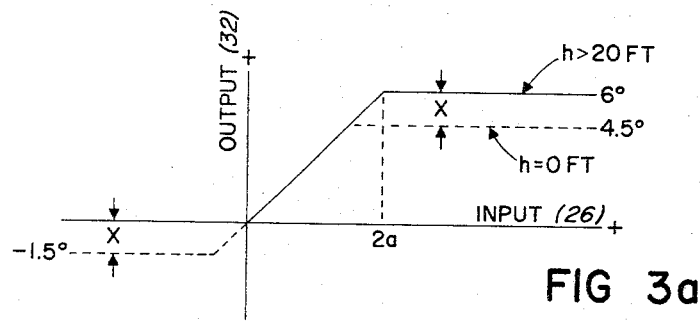
FIGURES 3a and 3b are, respectively, a flare command limit function and a functional diagram of a system for generating the function in the flare command limiter of FIGURE 1.
Figure 3B:
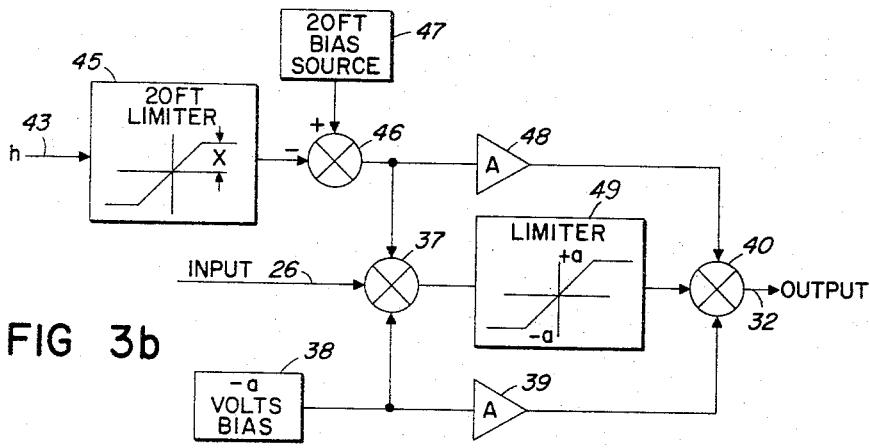

An embodiment of flare command limiter 27 is illustrated in FIGURE 3b. FIGURE 3a illustrates the transfer function of flare command limited 27 from input 26 to output 32. Above twenty feet of altitude the transfer function of flare command limiter 27 rejects signals of a negative sense and passes signals of a positive sense with unity gain up to a limit. The transfer function is terminated at a limit in accordance with the particular dynamic range of flare command signals for a particular design. Let it be assumed therefore that the output from flare command limiter 27 is to respond to input signal on a unity gain basis for input signals from zero to a value of $2a$ as indicated by the solid line function of FIGURE 3a. With reference to FIGURE 3b, input signals 26 are applied as a first input to mixer 37. A second input to mixer 37 is determined from a source 38 in the form of a bias of minus $a$ volts. The output from mixer 37 is applied to a limiter 49 which might be in the form of an operational amplifier producing unity gain between input signal levels from $-a$ to $+a$, with output limited at the $\pm a$ volt levels. The output from limiter 49 is applied to a mixer 40 along with an inverted bias voltage from inverter 39. Thus, mixer 37 receives input 26 and a bias corresponding to the limit of limiter 49 and applied in the negative sense. Mixer 40 receives the output from limiter 49 along with the limit bias voltage applied in a positive sense.

The operation of FIGURE 3b as thus far described (for altitudes in excess of twenty feet) rejects input signals of a negative sense and passes input signal over a positive sense on a unity gain basis up to a limit of twice the bias voltage or $2a$. In effect, the particular bias applications at both the input and output of limiter 49 shift the transfer function of limiter 49 to the right as pictured in the figure by a value of $a$ and upward by a value of $a$ to arrive at the function pictured in FIGURE 3a as the over-all transfer function of the flare command limiter between input 26 and output 32.

The transfer characteristic depicted in FIG. 3a is altered for altitudes of less than twenty feet so as to allow the passage of negatively sensed signals. For this purpose the solid line characteristic depicted in FIGURE 3a is altered as a function of radio altitude to pass negatively sensed signals linearly to some predetermined negative limit with the limit being a function of altitude. This is depicted in FIGURE 3a as a dashed line extension through the zero axis of the linear portion of the characteristic to a predetermined maximum negative limit and is implemented by the addition to the circuitry of FIGURE 3b of further input parameters. Typical limit values of FIGURE 3a might be such as to define pitch commands from zero to plus six degrees above twenty feet and the modification of the transfer characteristic would allow negative flare pitch commands to be passed to a maximum limit of minus 1.5 degrees at zero altitude.

With reference to FIGURE 3b, radio altitude signal 43 is applied to a limiter 45 which passes input signals linearly up to those corresponding to twenty feet of altitude. The output from limiter 45 is applied to a further mixer 46 which additionally receives a bias signal corresponding to twenty feet of altitude. The outputs from limiter 45 and the bias source 47 are applied in opposite sense to mixer 46. The output from mixer 46 is applied as a further input to mixer 37 and through an inverting amplifier 38 as an additional input to mixer 40. In operation, for altitudes in excess of twenty feet the output from limiter 45 is at its limit of twenty feet, the output from mixer 46 is zero, and the basic operation of the solid line characteristic of FIGURE 3a is unaffected. For altitudes less than twenty feet, the output from mixer 46 is a positive sensed signal proportional to the difference between the twenty foot bias source 47 and the radio altitude signal. This difference is indicated in FIGURE 3a as the voltage X corresponding to the limit of limiter 45. This signal is applied in a positive sense to mixer 37 to effectively extend the linear portion of the transfer characteristic in a negative direction to the maximum limit of X in the negative direction at zero altitude. The output from mixer 46 is additionally applied through the inverting amplifier 48 so as to subtract in mixer 40 from the normal output and thus the upper limit of the normal transfer characteristic of FIGURE 3a is correspondingly reduced up to a maximum of X at zero altitude. The transfer characteristic FIGURE 3a thus rejects negative sensed input signals for altitudes above twenty feet and, at altitudes below twenty feet, accepts negative sensed input signals to a negative limit with the negative limit varying inversely with altitude.

Operation of FIGURE 3b may be illustrated by assuming input signals of particular magnitude and sense. For example, assume operation is under the normal transfer characteristics for altitudes over twenty feet and that input signals from zero to four volts are to be passed by the limiter with the output limited at the four volt level. In this case, the a reference becomes 2. Limiter 49 would be designed to limit at —2 and +2 volts respectively. The bias source 38 would be chosen as —2 volts. An input of zero volts would result in a —2 volts being applied to limiter 49 from mixer 37 which in turn would pass a —2 volts to mixer 40 where it is combined with a +2 volts from inverter 39 to provide a zero output. In response to a +2 volts input signal, the output from mixer 37 becomes zero volts and mixer 40 receives zero volts from limiter 49 along with +2 volts from inverter 39 to produce an output of +2 volts.

With the assumed limit value of 4 volts as input, the output from mixer 37 becomes +2 volts and mixer 40 receives +2 volts from limiter 49 along with +2 volts from inverter 39 to arrive at an output of +4 volts. With input voltages above a 4 volt level it is seen that the output from limiter 49 stays at the +2 volt limit and is constantly combined with +2 volts from inverter 39 to maintain the output at +4 volts.

The rejection of negative sensed input signals may be appreciated by assuming an input of —1 volt which results in —3 volts being applied to limiter 49 from mixer 37. However, the output from limiter 49 is limited in this situation to —2 volts. The —2 volts from limiter 49 then combines with +2 volts from inverter 39 at mixer 40 to produce zero output.

A typical value of the maximum negative limit for altitudes below twenty feet might be one volt at zero altitude in which case the flare command limiter may be shown to push negatively sensed input signals linearly up to a limit of —1 volt. At ten feet of altitude, negatively sensed input signals would be passed up to a limit of one-half volt.

The above description relating to implementations of shaping network 15 and the flare command limiter 27 are based on preferred functional representations for computations involving A.C. signals wherein the + and — notations would refer to in-phase and out-of-phase conditions. It is anticipated that, should the computations of the flare computer be based on D.C. signals, the form of the shaping network 15 and that of limiter 27 might include a variety of implementations employing appropriately polarized diodes, Zener diode limiters, and resistive networks to arrive at the desired function.

The present invention is thus seen to provide a novel flare computer for directing an aircraft in the vertical plane from a predetermined altitude to touchdown in the terminal phase of a landing.

The invention is seen to present a "self-synchronization" feature wherein a programmed descent rate may be initially smoothly intercepted and maintained to effect an asymptotic or flare approach to a positive touchdown at termination.

Although this invention has been described with respect to a particular embodiment thereof it is not to be so limited as changes might be made therein which fall within the scope of the invention as defined in the appended claims.

We claim:
1. Means for controlling the descent of an aircraft from a predetermined altitude to zero altitude, comprising means for developing a first signal proportional to the instantaneous descent rate of said aircraft, means for developing a second signal proportional to a predetermined commanded descent rate as a function of the instantaneous aircraft altitude, said first and second signals being oppositely sensed, first signal mixing means receiving said first and second signals and developing an output proportional to the algebraic difference between said signals, signal translating means receiving the output of said mixing means, said signal translating means being adapted to produce an output proportional to those input signals thereto having a sense like that of said first signal and rejecting a predetermined range of input signals thereto having a sense opposite that of said first signal, and control means receiving the output of said translating means and being effective to control the rate of descent of said aircraft in response to the output of said signal translating means.

2. Control means as defined in claim 1 wherein said predetermined commanded descent rate is a linearly decreasing function of said aircraft altitude from said predetermined altitude to a lesser predetermined altitude and is a constant function of altitude from said lesser predetermined altitude to zero altitude.

3. Control means as defined in claim 2 wherein said signal translating means rejects the complete range of input signals thereto having a sense opposite that of said first signal.

4. Control means as defined in claim 2 wherein said signal translating means receives a signal proportional to aircraft altitude and includes means responsive to said altitude signal to enable the passage therethrough of a predetermined range of input signals having a sense opposite that of said first signal for altitude signals beneath a further predetermined altitude.

5. Control means as defined in claim 4 wherein said predetermined range of input signals is proportional to said altitude signal and varying from zero at said further predetermined attitude to a maximum range at zero altitude.

6. Control means as defined in claim 3 wherein said first signal is applied to signal limiting means prior to said application to said first mixing means, said limiting means defining a predetermined maximum descent rate signal which may be applied to said first mixing means.

7. Control means as defined in claim 6 wherein a first damping signal is combined with the signals applied to said first mixing means, said first damping signal comprising a signal proportional to the pitch attitude of said aircraft.

8. Control means as defined in claim 7 wherein a further feedback signal comprising a signal proportional to aircraft elevator position is combined with the output of said signal translating means, and said last defined combined signal is connected to flight control apparatus responsive to said signal to control said aircraft rate of descent.

9. Control means as defined in claim 8 wherein said means for developing said commanded descent rate signal comprises means for algebraically combining said signal proportional to altitude with a fixed bias signal of positive sense and proportional to a predetermined descent rate to be commanded for said lesser predetermined altitude, means for applying said radio altitude signal in inverted sense to a signal limiting means, said signal limiting means being adapted to pass with unity gain input signals thereto up to a limit defined by the altitude signal proportional to said lesser predetermined altitude, the output from said limiter being additionally algebraically combined with said radio altitude and bias signals, whereby the resultant of said algebraic signal combination is a signal proportional to a commanded descent rate as a function of said input altitude signal.

10. Control means as defined in claim 9 wherein said signal translating means comprises a signal limiting means adapted to pass input signal thereto with unity gain between predetermined oppositely sensed limits and to produce an output equal to said predetermined limit for input signal in excess of said limits, a signal mixing means receiving an input signal proportional to the algebraic difference between said first and second signals as a first input thereto, said mixing means receiving a fixed bias signal corresponding to the negative sensed limit of said limiting means as a second input thereto, the output from said mixing means applied to said limiter means, a further mixing means receiving the output from said limiter and said bias signal in opposite sense as inputs thereto, and an output taken from said further mixing means.

11. Control means as defined in claim 5 wherein said first signal is applied to signal limiting means prior to said application to said first mixing means, said limiting means defining a predetermined maximum descent rate signal which may be applied to said first mixing means.

12. Control means as defined in claim 11 wherein a first damping signal is combined with the signals applied to said first mixing means, said first damping signal comprising a signal proportional to the pitch attitude of said aircraft.

13. Control means as defined in claim 12 wherein a further feedback signal comprising a signal proportional to aircraft elevator position is combined with the output of said signal translating means, and said last defined combined signal is connected to flight control apparatus responsive to said signal to control said aircraft rate of descent.

14. Control means as defined in claim 13 wherein said means for developing said commanded descent rate signal comprises means for algebraically combining said signal proportional to altitude with a fixed bias signal of positive sense and proportional to a predetermined descent rate to be commanded for said lesser predetermined altitude, means for applying said radio altitude signal in inverted sense to a signal limiting means, said signal limiting means being adapted to pass with unity gain input signals thereto up to a limit defined by the altitude signal proportional to said lesser predetermined altitude, the output from said limiter being additionally algebraically combined with said radio altitude and bias signals, whereby the resultant of said algebraic signal combination is a signal proportional to a commanded descent rate as a function of said input altitude signal.

15. Control means as defined in claim 14 wherein said signal translating means comprises a signal limiting means adapted to pass input signal thereto with unity gain between predetermined oppositely sensed limits and to produce an output equal to said predetermined limit for input signal in excess of said limits, a signal mixing means receiving an input signal proportional to the algebraic difference between said first and second signals as a first input thereto, said mixing means receiving a fixed bias signal corresponding to the negative sensed limit of said limiting means as a second input thereto, the output from said mixing means applied to said limiting means, a further mixing means receiving the output from said limiter and said bias signal in opposite sense as inputs thereto, a further signal limiting means receiving a signal proportional to aircraft altitude, the output of said further limiting means being limited at a level corresponding to input signals proportional to said further predetermined altitude means for algebraically combining the output of said further limiting means in a negative sense with a positive sensed bias signal of amplitude corresponding to the unit of said further limiting means, said last defined algebraic combination being applied as a third input to said mixing means and in inverted sense as a third input to said further mixing means, and an output taken from said further mixing means.

References Cited
UNITED STATES PATENTS 3,052,427    9/1962    Match et al. _____ 244—77

MILTON BUCHLER, *Primary Examiner.*

B. BELKIN, *Assistant Examiner.*